United States Patent [19]

Ritter

[11] 4,128,022
[45] Dec. 5, 1978

[54] ROTATABLE SHAFT COUPLING

[75] Inventor: Arthur J. Ritter, Metamora, Ill.

[73] Assignee: Caterpillar Tractor Co., Peoria, Ill.

[21] Appl. No.: 768,121

[22] Filed: Feb. 14, 1977

[51] Int. Cl.² ............................................. F16H 47/02
[52] U.S. Cl. ..................................... 74/694; 74/695;
74/700; 74/701; 64/9 R
[58] Field of Search .................... 64/9 R; 74/695, 694,
74/700, 701

[56] References Cited

U.S. PATENT DOCUMENTS

| 2,556,194 | 6/1951 | Keese | 74/700 |
| 2,661,634 | 12/1953 | Bechman | 74/700 |
| 2,915,920 | 12/1959 | Keese | 74/700 |
| 3,035,455 | 5/1962 | Peras | 74/700 |
| 3,312,060 | 4/1967 | Gabriel | 74/695 |
| 3,424,031 | 1/1969 | Stockton | 74/695 |
| 3,895,546 | 7/1975 | Yamaguchi | 74/695 |
| 3,915,030 | 10/1975 | Ritter | 74/700 |
| 4,056,988 | 11/1977 | Kubo | 74/695 |

Primary Examiner—Benjamin W. Wyche
Assistant Examiner—R. C. Turner
Attorney, Agent, or Firm—Wegner, Stellman, McCord, Wiles & Wood

[57] ABSTRACT

Two coaxial shafts having respective adjacent ends are joined together by a coupling assembly including a coupling sleeve which is rotatably supported within the interior of a third shaft concentrically disposed about the coaxial shafts. The adjacent ends of the coaxial shafts have external splines which are configured to be inserted into and engage internal splines formed in the bore of the coupling sleeve. The third shaft is rotatably supported by a housing in which the coupling assembly is positioned and may include an output sleeve portion. The coupling assembly is advantageously employed in the drive train of heavy vehicles in which the coaxial shafts form a part of the transmission input shaft and the third shaft forms a part of the transmission output shaft.

9 Claims, 3 Drawing Figures

ROTATABLE SHAFT COUPLING

BACKGROUND OF THE INVENTION

1. FIELD OF THE INVENTION

This invention relates generally to a shaft coupling and, more particularly, to a coupling for connecting the ends of two coaxial shafts positioned within a third shaft so that relative rotation between the coaxial shafts and the third shaft is permitted.

2. DESCRIPTION OF THE PRIOR ART

While this invention may be employed in many fields, it is particularly useful in conjunction with drive train assemblies for heavy-duty earthmoving equipment, such as crawler tractors or other tracked vehicles.

Presently, the drive train of such a vehicle includes an engine, a torque converter powered by the engine and a gear assembly driven by the torque converter through a transmission. The gear assembly rotates a drive axle which carries a drive sprocket engaging the endless track to effect travel thereof. Typically, the aforementioned components are arranged in series with the engine located at the forward end and the drive axle located at the rearward end of the vehicle. However, it has been found that such an arrangement is not always possible or necessary. For example, the transmission might be positioned rearwardly of the drive axle with the transmission input shaft extending rearwardly from the torque converter past the drive axle and the transmission output shaft extending forwardly to drive the connecting gears which rotate the drive axle.

In some situations, the available space within the vehicle is limited and the use thereof critical. In order to reduce the amount of required space for the drive train, the transmission is constructed so that the input and output shafts extend from the transmission in one direction and are concentrically arranged, the output shaft being disposed about the input shaft.

Usually, the transmission, the gear assembly and the drive axle are sealed within a suitable housing filled with lubricating fluid. A long input shaft extends between the torque converter and the transmission and an output shaft, through which the input shaft extends, drives an output sleeve or gear to rotate the drive axle. However, the utilization of the long input shaft renders servicing of this portion of the drive train, particularly, the transmission and the interconnecting shafts, somewhat difficult. First, the input shaft can only be disconnected from the other components with difficulty and, second, the long shaft, particularly in large vehicles, is extremely heavy which does not permit facile handling thereof.

SUMMARY OF THE INVENTION

The present invention is directed to overcoming one or more of the problems as set forth above.

According to the present invention, a shaft coupling assembly for connecting first and second coaxial shafts, having adjacently disposed ends within a third shaft disposed about at least one of the first and second shafts, includes a coupling sleeve journaled for rotation within the third shaft and having a bore coaxial with the shafts. Internal axially extending splines are formed in the wall of the coupling sleeve bore and releasably engage external axially extending splines at the ends of the first and second shafts which are inserted therewithin. As a result, the first and second shafts are fixed together against relative rotational movement.

Such a shaft coupling assembly can be advantageously employed in a vehicle drive train. The first shaft is a part of the torque converter output shaft assembly and the second shaft is the transmission input shaft. The third concentrically disposed shaft is the transmission output shaft and includes a gear member or output sleeve for rotating the driving gear assembly.

Herein, the output sleeve is journaled at the rearward end of the cross tube drive axle housing and the first shaft is journaled at the forward end of the cross tube housing. The transmission output shaft has external splines which releasably engage internal splines at one end of the output sleeve to effect operative engagement therebetween. The coupling sleeve which joins the torque converter output shaft and the transmission input shaft is supported within the output sleeve by a bearing assembly to provide friction free rotation therebetween.

The shaft coupling assembly allows the shaft to be removed from either end of the cross tube housing and facilitates the assembly of any of the shafts. It also allows the transmission input shaft to be constructed from two short lengths thereby eliminating the need for a single long shaft. This makes assembly of the transmission and the interconnecting shafts relatively simple. The two short lengths of the input shaft are axially spaced apart to permit axial floating adjustment between the shafts, to permit rotation of the shafts when the universal joint is misaligned, to permit adjustment for axial tolerance stack up and to permit axial movement of the shaft to facilitate universal joint removal.

BRIEF DESCRIPTION OF THE DRAWINGS

The details of construction and operation of the invention are more fully described with reference to the accompanying drawings which form a part hereof and in which like reference numerals refer to like parts throughout.

In the drawings.

DESCRIPTION OF THE PREFERRED EMBODIMENT

Figure 1:
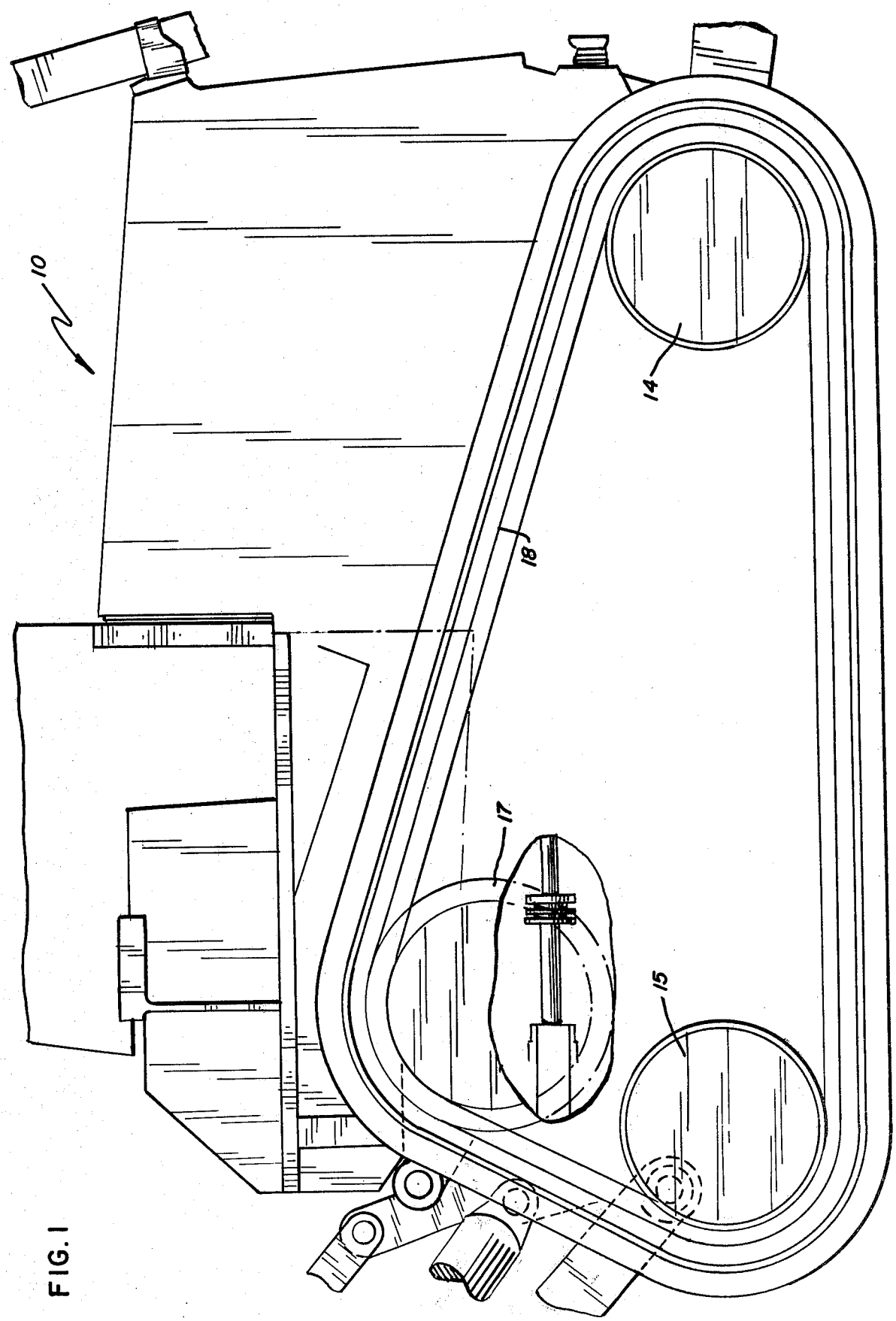
FIG. 1 is an elevational view of a tracked vehicle partially broken away to illustrate the position at which the rotatable shaft coupling of the invention may be applied.

Referring to the drawings, and in particular to FIG. 1, a tracked vehicle, generally designated 10, is seen to include a frame 12, front and rear idlers 14 and 15, respectively, a drive sprocket 17, and an endless track 18 which is driven by the drive sprocket 17 to effect travel of the vehicle 10.

Figure 2:
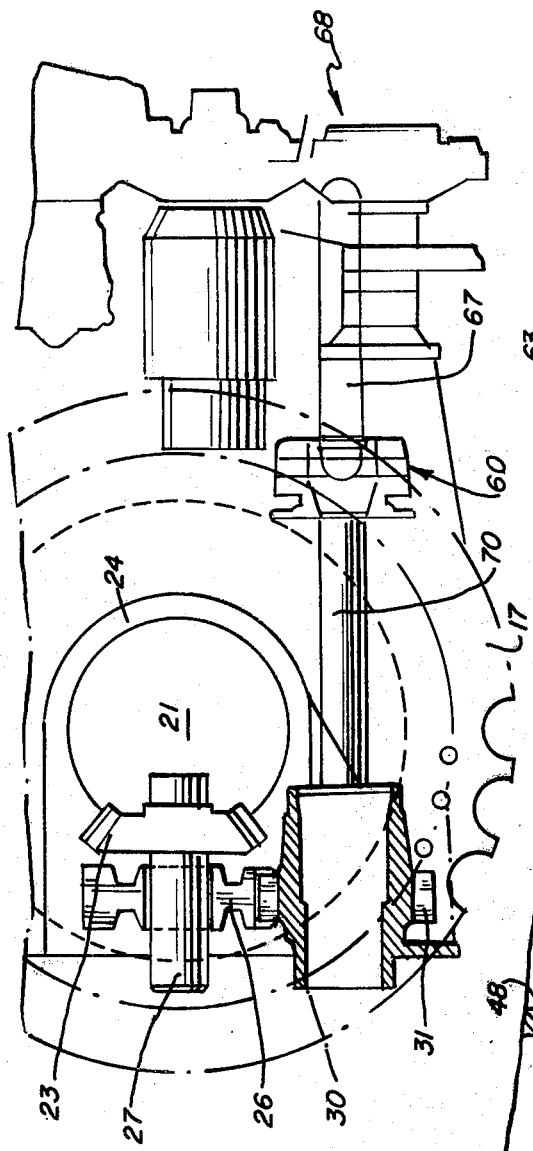
FIG. 2 is an enlarged fragmentary elevational view illustrating that portion of the tracked vehicle which is generally exposed by the broken away portion of FIG. 1.

As best seen in FIG. 2, the drive sprocket 17 is carried on an axle 21 which is rotated by a bevel gear 23 interacting with a gear indicated at 24 fixed to the axle 21. The bevel gear 23, in turn, is rotated by a gear 26 mounted on common shaft 27. The gear 26, as will later be readily apparent, is rotated by an output sleeve 30 which has external radially extending teeth 31.

Figure 3:
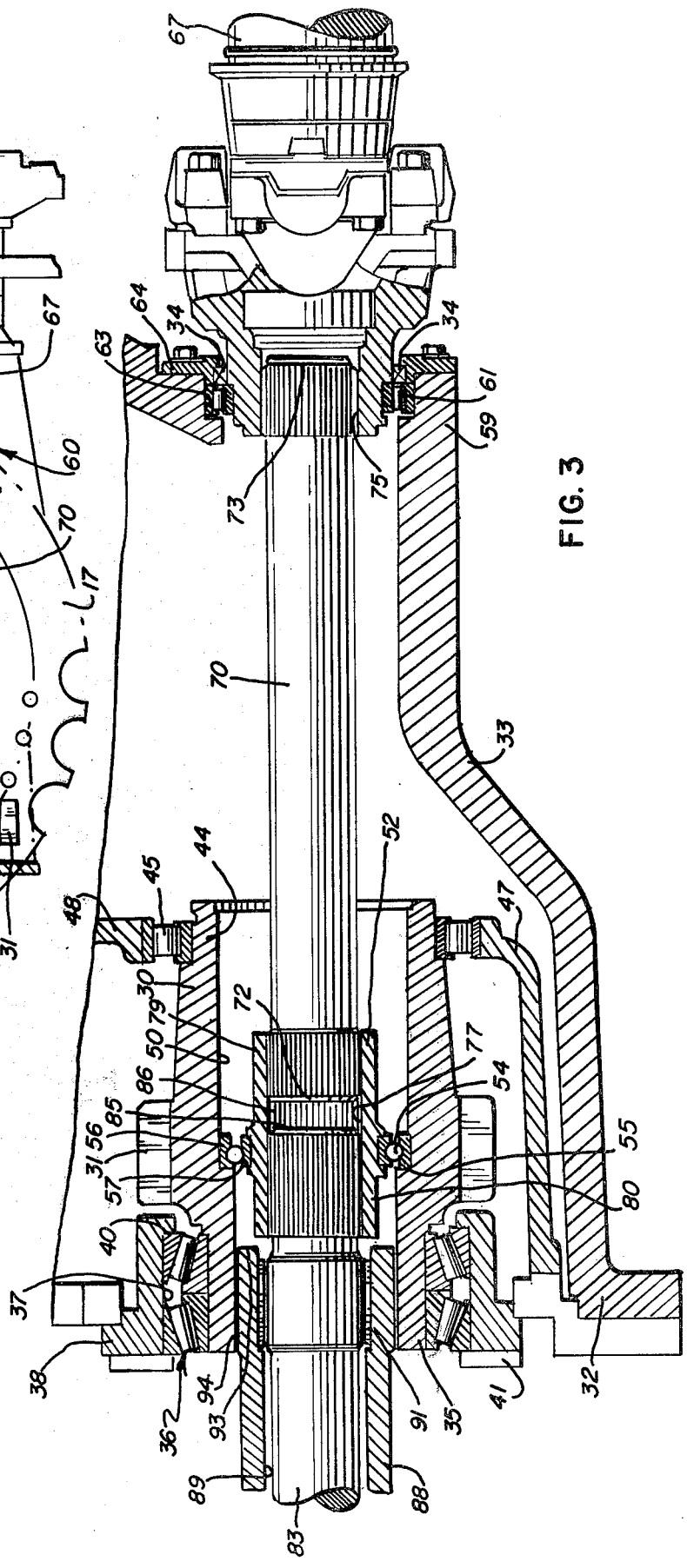
FIG. 3 is an enlarged fragmentary cross-sectional view of a portion of the drive assembly of FIG. 2 illustrating a rotatable shaft coupling constructed in accordance with the invention.

In FIG. 3, the output sleeve 30 is seen to be journaled adjacent one end 32 of a housing 33. Herein, the housing 33 is the cross tube axle housing which rotatably supports the sprocket drive axle 21. The housing 33 is appropriately sealed as by seals 34 and is filled with suitable lubricating fluid. The outward end 35 of the output sleeve 30 is supported by dual tapered roller bearings 36 carried within a cylindrical bore 37 defined in a housing end plate member 38. The tapered roller bearings 36 are retained in position by a shoulder 40 at the inward end of the end plate member 38 and by an abutment member 41 suitably mounted outboard of the end plate member 38. The inward end 44 of the output sleeve 30 is supported by cylindrical roller bearings 45 carried by housing portions 47 and 48.

The output sleeve 30 has an axially extending bore 50 in which a coupling sleeve 52 is rotatably supported by a ball bearing 54. The bore 50 has a larger diameter at the inward end 44 than at the outward end 35 so as to define an internal shoulder 55. The outer race 56 of the bearing 54 carried within the bore 50 is seated against the shoulder 55, while the inner race 57 is axially fixed in an annular recess (not numbered) formed on the circumference of the coupling sleeve 52. This construction permits the bearing 54 to be axially withdrawn with the coupling sleeve 52 from the output sleeve 30.

At the opposite end 59 of the housing 33, an external universal connection 60 is rotatably supported by a cylindrical roller bearing 61 which is carried within a bore 63 and retained therein by abutment member 64. Operatively connected to the universal connection 60 is a drive shaft 67 which is rotated by motor means, such as a torque converter, generally designated 68, which is, in turn, powered by the vehicle engine.

Extending between the coupling sleeve 52 and the universal connection 60 is an input shaft 70 which has respective inward and outward ends 72 and 73 having external axially extending splines adjacent thereto. The outward splined end 73 is received within an internally splined bore 75 defined by the universal connection 60. The inward splined end 72 is positioned within end 79 of an internally splined axial bore 77 which extends between the respective ends 79 and 80 of the coupling sleeve 52. As a result, the input shaft 70 provides an operative connection between the drive shaft 67 and the coupling sleeve 52 so that they are rotated as a unit.

A transmission input shaft 83, coaxial with the input shaft 70, has an inward end 85 which is received within the end 80 of the coupling sleeve 52 and has external axially extending splines which engage at 86 the internal splines formed in the wall of the bore 77 of the coupling sleeve 52. The inward end 85 of the shaft 83 is axially spaced from the end 72 of the input shaft 70 for a reason to be explained more fully hereinafter. The transmission input shaft 83 extends into a transmission (not shown) which can be secured at the left end of the housing 33. The transmission input shaft 83 extends through the transmission housing to drive the transmission sun gear as is conventional.

Through the rotation of the sun gear and the planetary gears and the manipulation of various clutches, rotation is finally imparted to a transmission output shaft 88. The output shaft 88 is coaxial with the input shaft 70 and the input shaft 83 and has a cylindrical axial bore 89 through which the input shaft 83 extends. The input shaft 83 is thus concentrically disposed within the output shaft 88 and is rotatably supported by needle bearings 91 which are positioned between the input shaft 83 and the output shaft 88. The output shaft 88 has an end 93 from which the input shaft 83 extends and adjacent which are formed external axially extending splines which engage at 94 internal axially extending splines formed in the wall of the bore 50 of the output sleeve 30 adjacent its outward end 35.

Consequently, the input shaft 70 and the input shaft 83 are interconnected at their respective adjacent ends by coupling sleeve 52 so that they are rotated as a unit. Similarly, the output shaft 88 and the output sleeve 30 are interconnected so that they rotate as a unit. Because of the separating bearings 54 and 91, relative rotation between these two units is permitted.

The coupling sleeve 52 allows both input shafts 70, 83 to be removed from either end of the housing 33 and also facilitates the reassembly of either shaft. That is, the drive shaft 67 can be disconnected from the shaft 70 by disconnecting the two halves of the universal connection 60 whereby the sealed cross tube axle housing 33 is not disturbed and the lubricant therein does not have to be drained. Likewise, the transmission can be disconnected from the cross tube axle housing 33 by withdrawing the shaft 83 from the coupling sleeve 52 without requiring that the seal for said cross tube axle housing 33 be broken.

The end 72 of the input shaft 70 was described above as spaced axially from the end 85 of the input shaft 83. The spacing between the ends of the shafts 70 and 83 makes it possible for the shaft 70 to float axially between the univeral joint 60 and the transmission input shaft 83 so as to prevent binding between the shafts. That is, in the event the universal joint 60 becomes misaligned with the input shaft 83 of the transmission, the shaft 70 will wobble as it rotates whereby the plane containing the end 72 of the shaft 70 will not be perpendicular to the axis of the shaft 83. In the just described state, the end 72 will axially oscillate, with part of the end 72 of the shaft extending forward of the usual position of the end of the shaft so that if sufficient axial clearance is not provided for between the end 72 of shaft 70 and end 85 of shaft 83, the shafts will bind and will not rotate.

The axial spacing of the ends 72 and 85 of the shafts 70 and 83, respectively, permits the shaft 70 to be shifted axially to facilitate disassembly of the universal joint 60. That is, the shaft 70 can be axially shifted away from the universal joint 60 so as to make it possible to pull the universal joint forward relative to the end 59 of the cross tube axle housing 33 until the joint 60 disengages from the shaft 70 whereupon it can be lifted out of the housing 33.

The axial spacing between the ends 72, 85 of shafts 70, 83, respectively, also allows for tolerance build up without binding between the shafts. The sum of the maximum tolerances on the shafts and parts can result in the shaft ends binding unless the additional axially spacing is provided between the ends 72, 85 of shafts 70, 83, respectively.

The embodiments of the invention in which an exclusive property or privilege is claimed are defined as follows:

1. A shaft coupling assembly comprising:
   a first shaft (70);
   a second shaft (83) coaxial with said first shaft (70) and having one end (85) adjacent one end (72) of said first shaft (70);
   a coupling sleeve (52) having an axial bore (77) coaxial with said first and second shafts (70, 83) and operatively coupling said shafts (70, 83) together;
   an output sleeve (30) coaxial with and encircling said coupling sleeve (52); and bearing means (54) extending between said output sleeve (30) and said coupling sleeve (52) to permit relative rotation therebetween whereby said first and second shafts (70, 83) are coupled together against relative rotation and rotate independently of said output sleeve (30).

2. A shaft coupling assembly for connecting first and second coaxial shafts (70, 83) having adjacently disposed ends (72, 85) within the coaxial bores (89, 50) of a third shaft (88) and an output sleeve (30) through which at least one of said first and second shafts (70, 83) extends, said shaft coupling assembly comprising:
   a coupling sleeve (52) positioned within the bore (50) of said output sleeve (30) and having a bore (77) coaxial with said first and second shafts (70, 83) extending between the adjacently disposed ends (79, 80) thereof with internal axially extending splines formed in the wall of said coupling sleeve bore (77), said first and second shafts (70, 83) having external axially extending splines at their respective adjacent ends (72, 85) configured to engage said internal splines to fix said first and second shafts (70, 83) together against relative rotational movement; and
   a bearing assembly (54) carried within the bore (50) of said output sleeve (30) between the internal wall thereof and said coupling sleeve (52), said bearing assembly (54) interacting with the exterior of said coupling sleeve (52) to mount said coupling sleeve (52) for independent rotation within said output sleeve (30).

3. The shaft coupling assembly of claim 2 wherein the bore (50) of said output sleeve (30) is larger at one end (44) thereof than at its other end (35) to define an internal shoulder (55), and said bearing assembly (54) includes an inner race (57) carried by the coupling sleeve (52), an outer race (56) carried by said output sleeve (30) and rolling members operatively positioned between said races (56, 57), said outer race (56) being seated against said internal shoulder (55), whereby said bearing assembly (54) may be withdrawn intact from said one end (44) of said output sleeve (30).

4. The shaft coupling of claim 3 wherein said inner race (57) of said bearing assembly (54) is axially fixed to said coupling sleeve (52), whereby withdrawal of said coupling sleeve (52) from said one end (44) of said output sleeve (30) effects withdrawal of said bearing assembly (54).

5. A rotatable coupling assembly mounted within a housing (33) having openings (37, 63) at opposite ends (32, 59) thereof, said coupling assembly comprising:
   an output sleeve (30) rotatably supported by said housing (33) at one open end (32) thereof, said output sleeve (30) having an axial bore (50) extending between its respective opposed ends (35, 44) with one end (35) opening externally of said housing (33) and being internally splined;
   a bearing assembly (36) disposed adjacent each end of said output sleeve (30) between said housing (33) and said output sleeve (30) for rotatably supporting said output sleeve (30) in said housing (33);
   a coupling sleeve (52) rotatably supported within said output sleeve (30) and having an internally splined bore (77) extending between its respective opposed ends (79, 80);
   a bearing assembly (54) disposed between said coupling sleeve (52) and said output sleeve (30) for rotatably mounting said coupling sleeve (52) for rotation independent of output sleeve rotation;
   a first shaft (70) coaxial with said coupling sleeve (52) and having one end (72) externally splined and extending into one end (79) of the bore (77) of said coupling sleeve (52) to releasably connect said first shaft (70) therewithin, said first shaft being rotatably supported by said housing at the opposite open end (59) and extending through the opening (63) in said housing (33) at the end opposite said output sleeve (30);
   a second shaft (83) coaxial with said first shaft (70) having one end (85) externally splined and extending into the other end (80) of the bore (77) of said coupling sleeve (52) to releasably connect said second shaft (83) therewithin; and
   a third shaft (88) coaxial with said first and second shafts (70, 83) and with said output sleeve (30), said third shaft (88) having an axial bore (89) extending between its respective opposed ends (93), said second shaft (83) being rotatably supported within the bore (89) and extending from one end (93) thereof into said coupling sleeve (52), one end (93) being externally splined and extending into said one end (35) of said output sleeve (30) to releasably connect said third shaft (88) therewithin, the other end of said third shaft (88) extending externally of one end of said housing (33), whereby said coupling sleeve (52) joins said first and second shafts (70, 83) together in coaxial relation for independent rotation relative to said third shaft (88).

6. The coupling assembly of claim 5 wherein said adjacent ends (72, 85) of said first and second shafts (70, 83) are coaxially spaced apart a distance sufficient to permit limited axial float between said shafts (70, 83).

7. A vehicle drive train incorporating the coupling assembly of claim 5 wherein said first shaft (70) has its opposite end (72) connected to power means (68) providing rotational torque to said first shaft (70), said second shaft (83) in an input shaft for a transmission, said third shaft (88) is an output shaft for the transmission, and said output sleeve (30) is part of a gear assembly (23, 26) rotating a drive axle (21), whereby said transmission and interconnecting shafts are axially removable from the remainder of the vehicle drive train.

8. The vehicle drive train of claim 7 wherein said power means (68) includes a universal joint (60) journalled at said opposite open end of said housing (33), said opposite end (73) of said third shaft (70) having external axial splines engaging an internally splined bore (75) to prevent relative rotation therebetween.

9. In a vehicle drive train including a housing (33) adapted to receive a drive shaft (67) at one end (59) and a transmission at the opposite end (32), and a gear train (26, 27, 24) for effecting rotation of the vehicle axle (21), a coupling assembly for operatively connecting the transmission to the drive shaft and the gear train comprising:
   an output sleeve (30) rotatably mounted at said opposite end (32) of the housing (33) and having external teeth (31) engagingly connected to the gear train (26) and an axial bore (50);
   a coupling sleeve (52) mounted within said output sleeve bore (50) and having an axial bore (77);
   bearing means (54) between said output sleeve (30) and said coupling sleeve (52) to permit relative motion therebetween;

a first shaft (70) within said housing (33) having one end (73) releasably coupled to the drive shaft (67) and its opposite end (72) releasably coupled at one end (79) of said coupling sleeve bore (77);

a second shaft (83) coaxial with said first shaft (70) and having one end (85) releasably coupled at the opposite end (80) of coupling sleeve bore (77) adjacent the other end (72) of said first shaft (70), said second shaft (83) being the transmission input shaft;

a third shaft (88) concentric about said second shaft (83) and having one end (93) releasably coupled to said output sleeve (30), said third shaft (88) being the transmission output shaft; and bearing means (91) between said second and third shafts (83, 88) to permit relative motion therebetween.

* * * * *